US010616190B2

(12) United States Patent
Geagan

(10) Patent No.: US 10,616,190 B2
(45) Date of Patent: Apr. 7, 2020

(54) REDUCED SIZE KEY ALLOCATION DESCRIPTORS

(71) Applicant: INTERNATIONAL BUSINESS MACHINES CORPORATION, Armonk, NY (US)

(72) Inventor: John B. Geagan, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 106 days.

(21) Appl. No.: 15/158,288

(22) Filed: May 18, 2016

(65) Prior Publication Data

US 2017/0338955 A1 Nov. 23, 2017

(51) Int. Cl.
*H04L 29/06* (2006.01)
*H04L 9/08* (2006.01)

(52) U.S. Cl.
CPC ........ *H04L 63/0442* (2013.01); *H04L 9/0836* (2013.01); *H04L 9/0891* (2013.01); *H04L 63/0428* (2013.01); *H04L 2209/601* (2013.01); *H04L 2463/061* (2013.01)

(58) Field of Classification Search
CPC ..... H04L 9/08; H04L 9/30; H04L 9/22; H04L 2209/601; H04L 9/0836; H04L 9/0891; H04L 63/0428; H04L 2463/061; G06F 21/10; G06F 21/31
See application file for complete search history.

(56) References Cited

U.S. PATENT DOCUMENTS

| | | | | |
|---|---|---|---|---|
| 6,445,797 | B1* | 9/2002 | McGough | H04L 9/0631 380/262 |
| 6,883,097 | B1* | 4/2005 | Lotspiech | H04N 7/163 348/E7.056 |
| 9,065,977 | B2* | 6/2015 | Candelore | H04L 9/083 |
| 2003/0142826 | A1 | 7/2003 | Asano | |
| 2004/0120529 | A1 | 6/2004 | Zhang | |
| 2007/0050849 | A1 | 3/2007 | Takashima | |
| 2008/0063200 | A1 | 3/2008 | Takashima | |

OTHER PUBLICATIONS

Fangming, Z. et al., "Secure authenticated key exchange with revocation for smart grid," (2012).
"Including URL to Media Key Block in Encrypted Content Header," (2004) IBM.
Stevenson, DA., "Standardized System Control Blocks," (2005).

* cited by examiner

*Primary Examiner* — Ali S Abyaneh
(74) *Attorney, Agent, or Firm* — Erik Huestis; Stephen Kenny; Foley Hoag

(57) ABSTRACT

Space-efficient methods of defining a key allocation scheme within a broadcast encryption system are provided. In some embodiments, a descriptor is received. The descriptor includes a plurality of subset definitions and a plurality of pointers. A data segment is resolved from each of the plurality of pointers. The resulting data segments are assembled into a plurality of variant definitions. A media key block is generated from the plurality of subset definitions and the plurality of variant definitions.

20 Claims, 6 Drawing Sheets

REDUCED SIZE KEY ALLOCATION DESCRIPTORS

BACKGROUND

Embodiments of the present invention relate to reduced size key allocation descriptors, and more specifically, to space-efficient methods of defining a key allocation scheme within a broadcast encryption system.

BRIEF SUMMARY

According to one embodiment of the present invention, a method of, and computer program product for, key allocation in a broadcast encryption scheme are provided. A descriptor is received. The descriptor includes a plurality of subset definitions and a plurality of pointers. A data segment is resolved from each of the plurality of pointers. The resulting data segments are assembled into a plurality of variant definitions. A media key block is generated from the plurality of subset definitions and the plurality of variant definitions.

DETAILED DESCRIPTION

Figure 1:
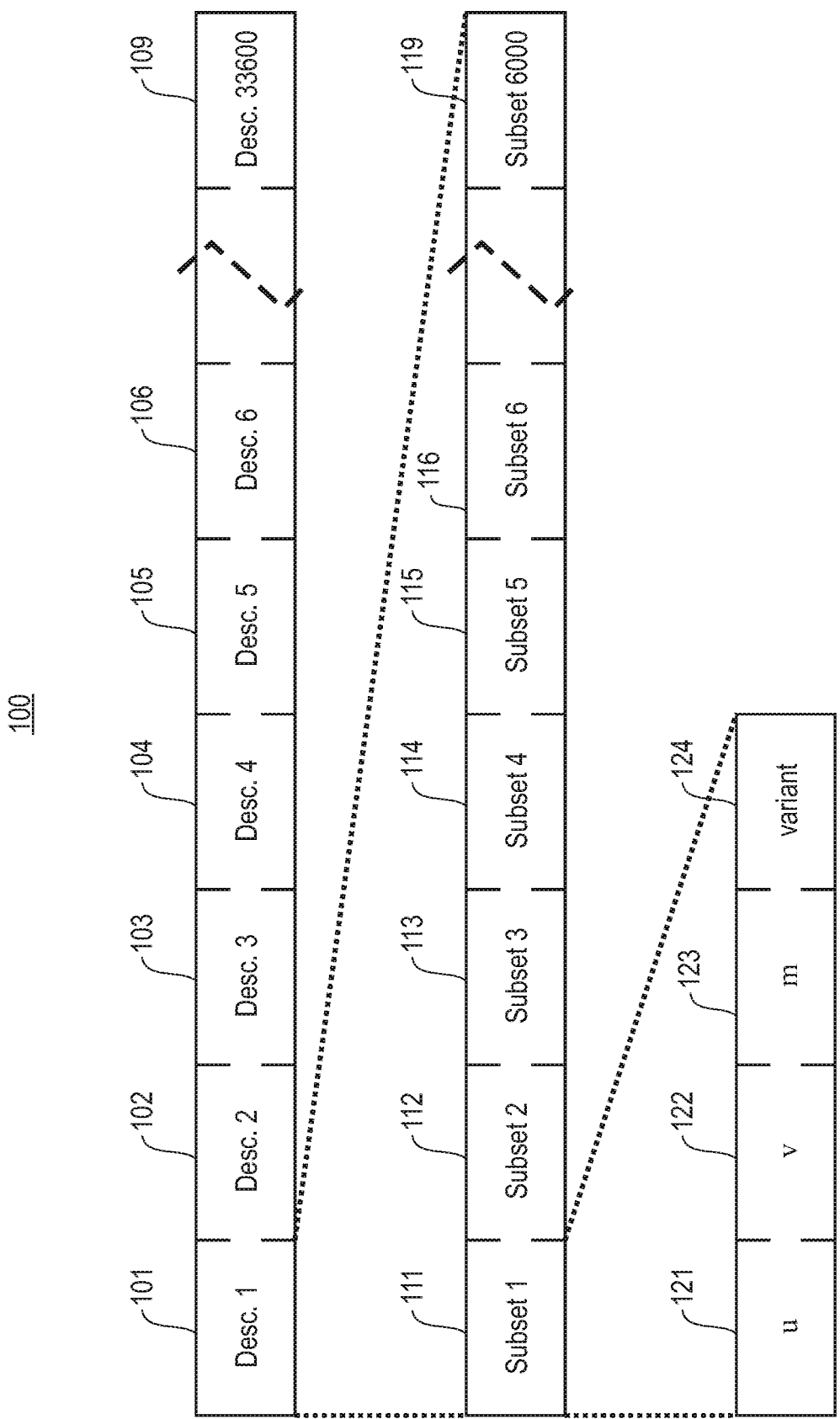
FIG. 1 depicts an exemplary media key block descriptor according to embodiments of the present disclosure.

A subset difference tree approach may be used in a broadcast encryption scheme to restrict authorized access to distributed content. NNL (named for Naor, Naor, and Lotspiech) provides space-efficient Key Allocations in Broadcast Encryption systems utilizing a subset difference tree. NNL uses a one-way triple function to traverse downwards through a binary tree and derive encryption keys from parent nodes, where application of the triple function allows determination of a processing key as well as left and right children of the node. Content consumers are allocated a unique small set of labels (keys) for specific starting nodes, and by applying the triple function, are able to derive any other labels and keys beneath (covered by) those starting labels. This ability to derive labels from other labels gives NNL its compactness, and in particular allows the distribution of a minimal set of keys to a client. Similarly, NNL enables the distribution of a minimal set of encryptions. Rather than distributing a version of a message encrypted for each target device, messages may be encrypted for subsets of devices using the subset difference tree approach.

In general, encrypted content is encrypted with a Media Key. The Media Key ($K_m$) is determined by an authorized content consumer by processing a Media Key Block (MKB) using a set of Device Keys ($K_d$). The Media Key is specific to the encrypted content, Device Keys are included in an authorized content consumer (such as a digital media player), and the Media Key Block is included with the encrypted content, for instance in the lead-in area of optical media such as a DVD.

In such a broadcast encryption scheme, a Key Generation Facility (KGF) is responsible for generating a plurality of encryption keys, including Media Keys and Device Keys. The Key Generation Facility is also responsible for generating a Media Key Block from which a given Media Key may be derived by an authorized content consumer.

The Key Generation Facility furnishes different authorized content consumers, or groups of consumers, different bundles of Device Keys. The Media Key Block is generated by the Key Generation Facility so that only authorized Device Keys are able to determine a given Media Key from the Media Key Block. If a given consumer or media player is no longer authorized to consume the encrypted content, then subsequent Media Key Blocks generated by the Key Generation Facility will not enable such revoked players to obtain the Media Key. In this way, a revoked consumer will be unable to decrypt content provided after its revocation.

In a subset-difference approached such as that adopted by AACS, the keyspace is defined by a large master tree of keys. Each authorized device is uniquely associated with a leaf node of the key tree. The bundle of device keys for each device contains exactly one unique leaf key. The remaining device keys in bundle are sufficient to derive every other key in the tree except the set of keys lying between the device's leaf key and the tree root. As noted above, each child key is computable from its parent key by application of a one-way function. So, a content consumer in possession of a given set of device keys cannot derive its own leaf key. However, any other content consumer with another device key bundle may do so.

Corresponding to every sub-tree in the master tree is a separate tree of keys supplemental to the master tree. For example, one level down from the root of the master binary tree there are two sub-trees, each with its own associated tree of keys. Consequently, at the bottom of the master tree, each pair of device-associated leaf nodes belongs to its own sub-tree of height 1. For each sub-tree corresponding to a node in the master tree between a given device's associated leaf node and the tree root, the device's set of device keys enables derivation of every key in that sub-tree except the keys between its leaf and the root within that sub-tree.

Using this relationship between keys, any leaf key may be revoked by including in the Media Key Block the Media Key encrypted only by that leaf nodes that is revoked. To revoke a continuous range of leaf keys, the Media Key may be encrypted by a key located higher in the master tree. Non-contiguous ranges of leaf keys may be revoked through use of the sub-tree system. A key associated with a single contiguous group of revoked Leaf Keys in a single sub-tree is used to encrypt the Media Key. This entry in the MKB allows devices that do not have that key to successfully compute the Media Key while preventing all devices containing the revoked leaf keys from successfully computing the Media Key. A similar encryption is repeated with other sub-trees, until all devices containing the revoked leaf keys are unable to compute the Media Key and all other devices can.

In some embodiments, a Key Generation Facility performs key generation based on a Media Key Block descriptor. However, such a descriptor grows as the underlying broadcast encryption scheme grows. For example, the AACS scheme grows with additional devices and with additional revocations. It is advantageous for such descriptors to be small, both for storage and transmission. Moreover, if the descriptor size can be kept small, the key allocation process and key generation processes can be separated across multiple computers and facilities.

With reference now to FIG. 1, an exemplary media key block descriptor is depicted. A plurality of descriptors 101 . . . 109 are included in a file 100. Each descriptor 101 contains a plurality of subsets 111 . . . 119. Each subset contains u, v, and mask data 121, 122, 123 defining a subset difference tree of a broadcast encryption scheme. In addition, each subset includes variant data 124. Variant data 124 define the media key variant that can ultimately be used to decrypt encrypted content.

In an exemplary embodiment, file 100 includes 3,360 descriptors and each descriptor contains 6,000 subsets. In some such embodiments, the u data are 1 byte, the v data are 4 bytes, the mask data are 1 byte and the variant data are 2 bytes. Thus, each subset is 8 bytes, each descriptor is 48,000 bytes and each file is 1,612,800,000 bytes or ~1.5 gigabytes.

Figure 2:
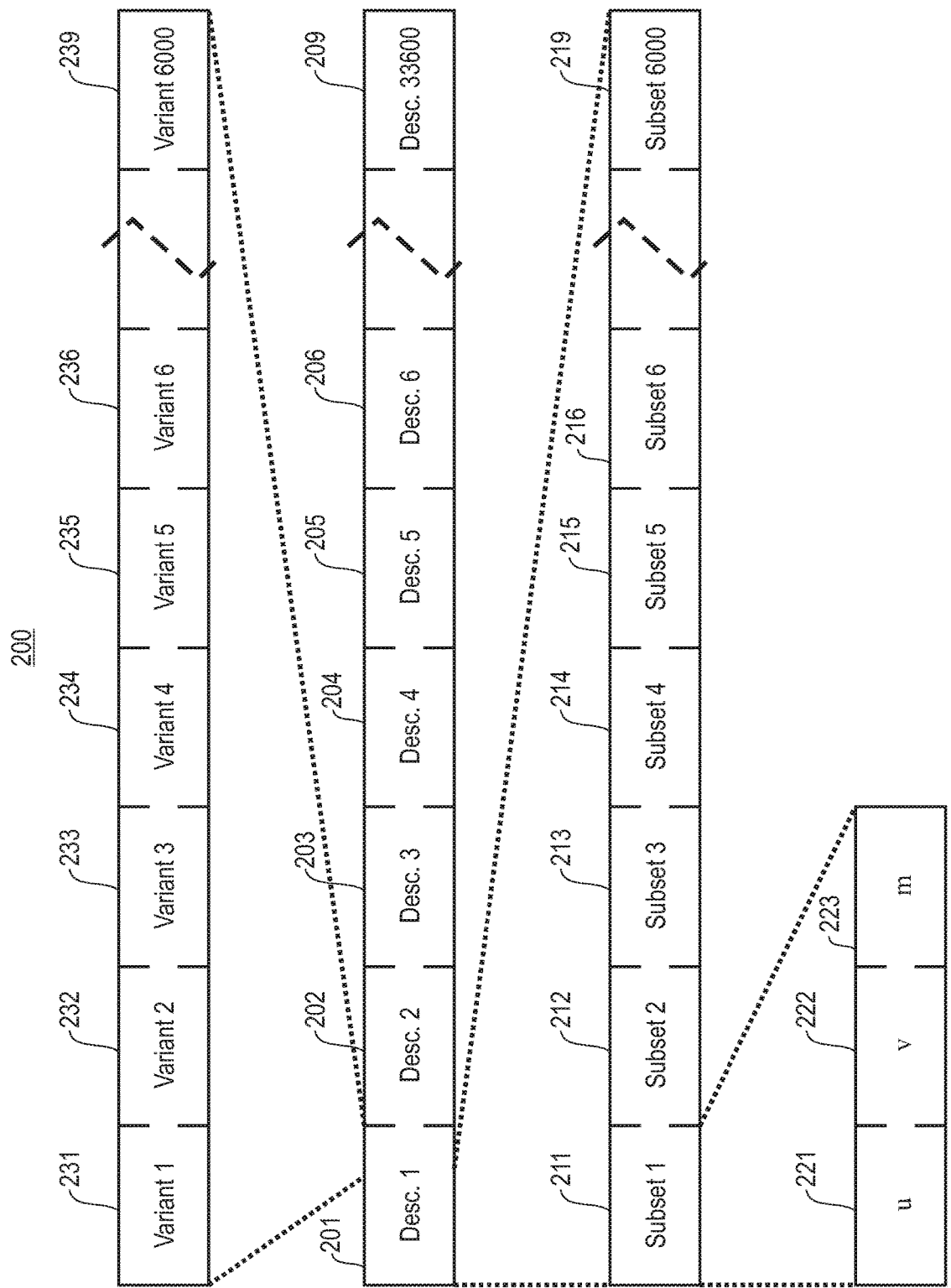
FIG. 2 depicts another exemplary media key block descriptor according to embodiments of the present disclosure.

With reference now to FIG. 2, another exemplary media key block descriptor is depicted. A plurality of descriptors 201 . . . 209 are included in a file 200. Each descriptor 201 contains a plurality of subsets 211 . . . 219 and a plurality of variant data 231 . . . 239. Each subset contains u, v, and mask data 221, 222, 223 defining a subset difference tree of a broadcast encryption scheme. Variant data 231 . . . 239 define the media key variant that can ultimately be used to decrypt encrypted content.

In an exemplary embodiment, file 200 includes 3,360 descriptors and each descriptor contains 6,000 subsets and 6,000 variants. In some such embodiments, the u data are 1 byte, the v data are 4 bytes, the mask data are 1 byte and the variant data are 2 bytes. Thus, each subset is 6 bytes, each descriptor is 48,000 bytes and each file is 1,612,800,000 bytes or ~1.5 gigabytes.

In some embodiments, only the variant data are different per descriptor. In such embodiments, duplicate subset definitions can be culled from file 200, yielding approximately 75% space savings overall. In some embodiments, the variant data can be packed into 10 bits, yielding space savings of approximately 37.5% for the variant data. In embodiments that combine both of these reductions, overall savings of 84% is realized. In such combined embodiments, the total space for subsets is 36,000 bytes or ~35 kilobytes and the total space for variants is 252,000,000 bytes or ~240 megabytes.

In some embodiments, the variant data are completely different for each and every descriptor. However, in some embodiments, further economies of space are realized by allowing limited duplication of portions of the variant data as described further below.

In some embodiments, a plurality of random values are computed to form a sequence. In an exemplary embodiment, 250 random values are computed of 256 bytes each. The probability of a collision is infinitesimal, as a 256 byte value can encode $2^{256} \approx 1.15 \times 10^{77}$ states. The variant can then be selected from the predetermined values while guaranteeing that no two variants are the same within a descriptor, and that the same variant does not occupy the same location within a descriptor.

Figure 3:
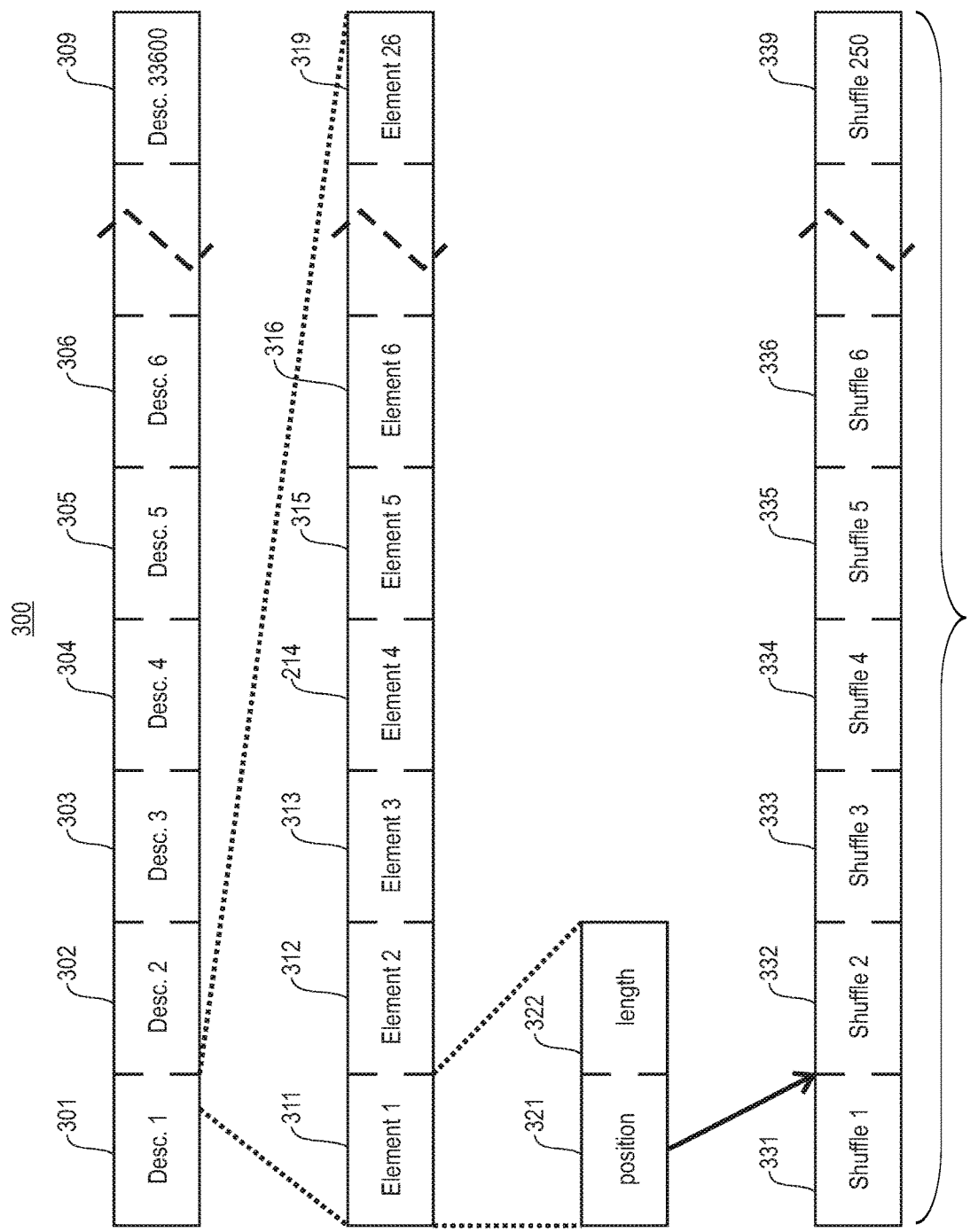
FIG. 3 depicts an exemplary variant descriptor according to embodiments of the present disclosure.

With reference now to FIG. 3, an exemplary variant descriptor is depicted. A plurality of descriptors 301 . . . 309 are included in a file 300. Instead of variants 231 . . . 239, descriptor 301 contains a plurality of elements 311 . . . 319. In some embodiments, 26 elements are provided. Each element contains a position 321 and a length 322. The position 321 provides a pointer to table 330. Within table 330 are random values 331 . . . 339 as described above. In this way, variant data within each descriptor are selected entirely from predetermined table 330, which is shared between all descriptors.

In embodiments such as described above with regard to FIG. 3, total space consumption for file 300 is greatly reduced without compromising the suitability of variant data. In some embodiments, table 330 requires 256×2 bytes per entry and has 250 entries, for a total of 128,000 bytes or 125 kilobytes. In some embodiments, 26 elements are included in each descriptor, each including a 4 byte pointer and a 2 byte length field. Thus, the descriptor data require a total of 5,241,600 bytes for variants or ~5.0 megabytes. Combining the ~5.0 megabytes in variant data with the ~35 kilobytes of subtree data and 125 kilobytes of lookup table yields ~5.2 megabytes.

Figure 4:
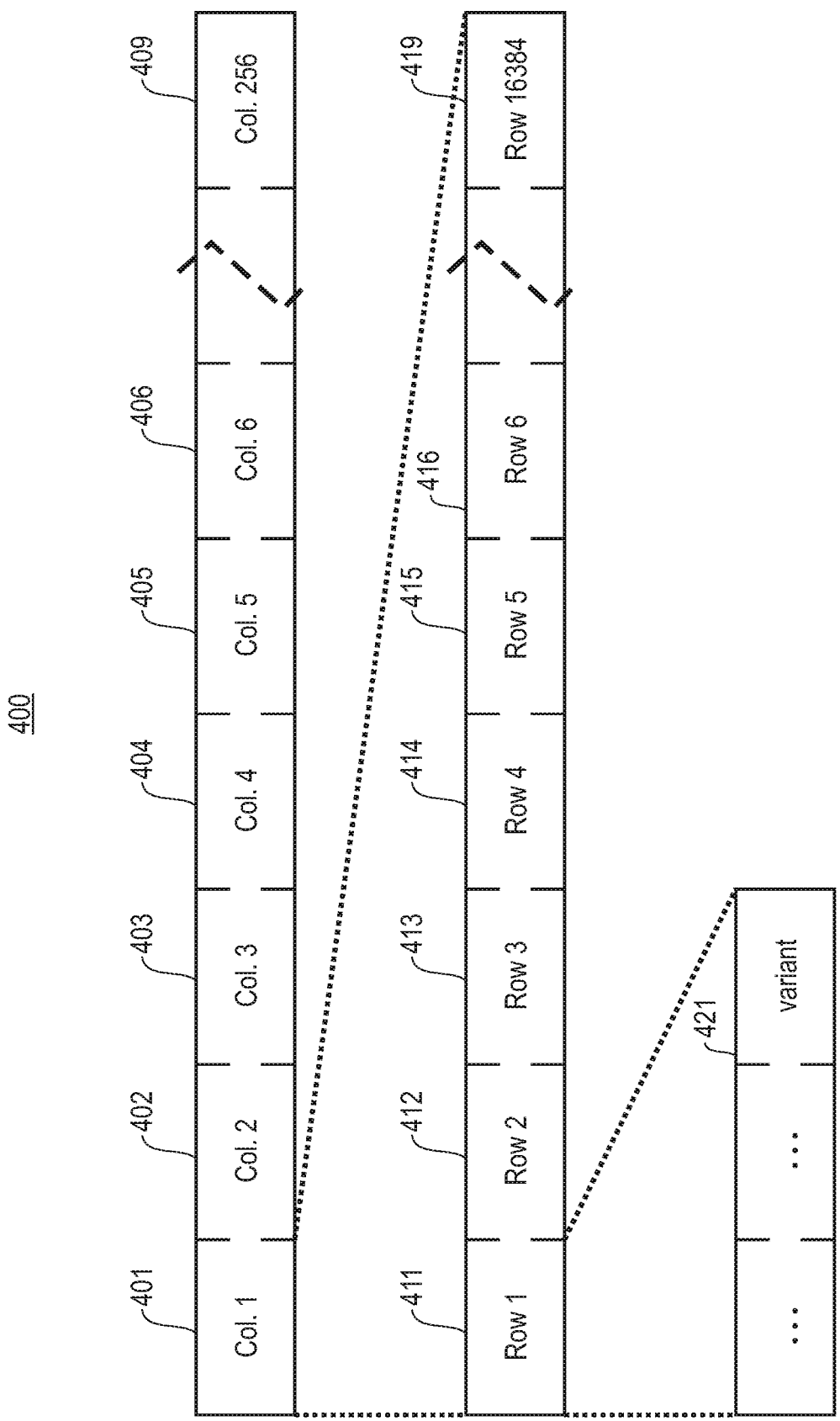
FIG. 4 depicts an additional exemplary data block descriptor according to embodiments of the present disclosure.

With reference now to FIG. 4, an exemplary data block descriptor is depicted. In some embodiments, the data block descriptor is a sequence key block descriptor. A plurality of descriptors 401 . . . 409 are included in a file 400. Each descriptor 401 contains a plurality of rows 411 . . . 419. Each row contains data, including variant 421. According to various embodiments, additional data in rows 411 . . . 419 include data sufficient to define a sequence key block in a broadcast encryption scheme. Variant data 421 define the media key variant that can ultimately be used to decrypt encrypted content.

Figure 5:
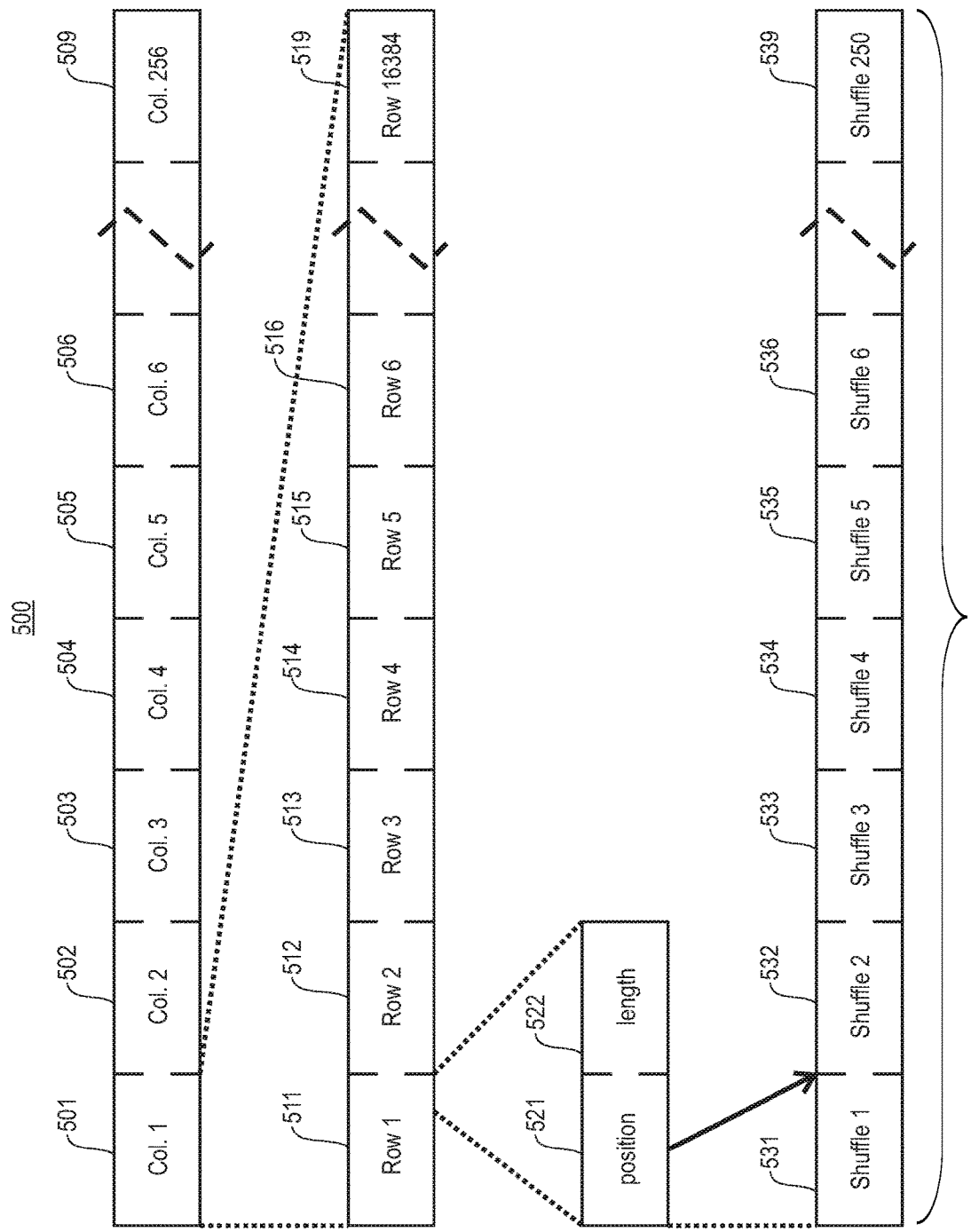
FIG. 5 depicts an additional exemplary variant descriptor according to embodiments of the present disclosure.

With reference now to FIG. 5, an exemplary variant descriptor is depicted. A plurality of columns 501 . . . 509 are included in a file 500. Instead of including variants 421 in each row 511 . . . 519, a position 521 and a length 522 are provided. The position 521 provides a pointer to table 530. Within table 530 are random values 531 . . . 539 as described above. In this way, variant data within each descriptor are selected entirely from predetermined table 530, which is shared between all descriptors.

Figure 6:
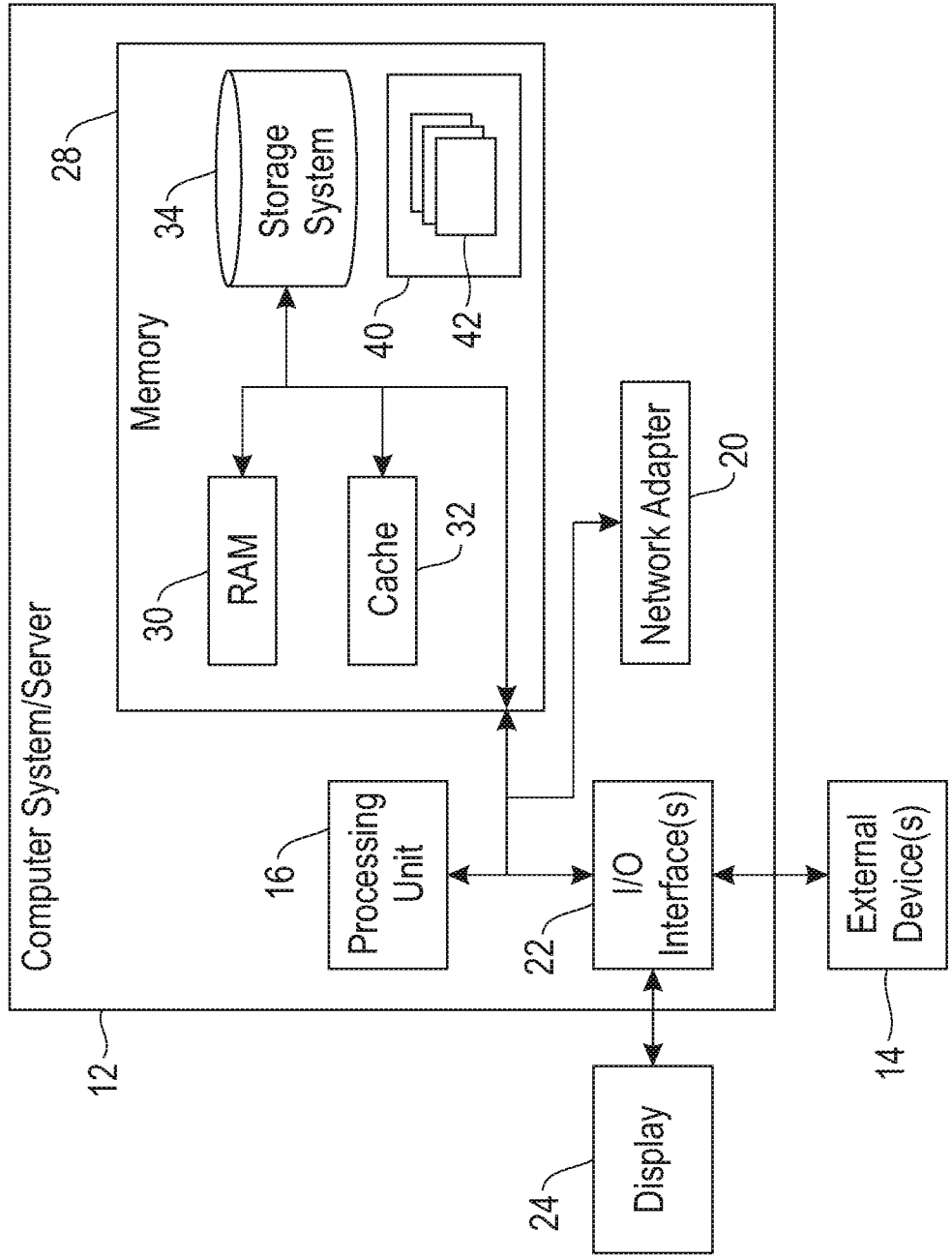
FIG. 6 depicts a computing node according to an embodiment of the present invention.

Referring now to FIG. 6, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for key allocation in a broadcast encryption scheme, the method comprising:
   receiving a descriptor selected from a plurality of descriptors, the descriptor comprising a plurality of subset definitions and a plurality of pointers, wherein each subset definition defines a subset difference tree of a broadcast encryption scheme, and wherein each of the plurality of pointers identifies a location in a predetermined table,
   the predetermined table being shared among the plurality of descriptors,
   wherein a total size of the plurality of descriptors is reduced by substituting the plurality of pointers for variant data in the descriptors;
   from each of the plurality of pointers, resolving a data segment in the predetermined table;
   assembling the resolved data segments into a plurality of variant definitions; and
   generating a media key block from the plurality of subset definitions and the plurality of variant definitions.

2. The method of claim 1, wherein said resolving the data segment comprises:
   looking up the data segment within a data source.

3. The method of claim 2, wherein the data source comprises a stream.

4. The method of claim 2, wherein the data source comprises a file.

5. The method of claim 2, wherein the data source comprises an array.

6. The method of claim 2, wherein the data source's contents are pseudorandom.

7. The method of claim 1, wherein the variant definitions are all different from each other.

8. The method of claim 1, further comprising:
   encrypting content such that an authorized device key in combination with the media key block is sufficient to decrypt the content.

9. A computer program product for key allocation in a broadcast encryption scheme, the computer program product comprising a computer readable storage medium having program instructions embodied therewith, the program instructions executable by a processor to cause the processor to perform a method comprising:
   receiving a descriptor selected from a plurality of descriptors, the descriptor comprising a plurality of subset definitions, and a plurality of pointers, wherein each subset definition defines a subset difference tree of a broadcast encryption scheme, and wherein each of the plurality of pointers identifies a location in a predetermined table
   the predetermined table being shared among the plurality of descriptors, wherein a total size of the plurality of descriptors is
reduced by substituting the plurality of pointers for
variant data in the descriptors;
from each of the plurality of pointers, resolving a data
segment in the predetermined table;
assembling the resolved data segments into a plurality of
variant definitions; and
generating a media key block from the plurality of subset
definitions and the plurality of variant definitions.

10. The computer program product of claim 9, wherein said resolving the data segment comprises:
looking up the data segment within a data source.

11. The computer program product of claim 10, wherein the data source comprises a stream.

12. The computer program product of claim 10, wherein the data source comprises a file.

13. The computer program product of claim 10, wherein the data source comprises an array.

14. The computer program product of claim 10, wherein the data source's contents are pseudorandom.

15. The computer program product of claim 9, wherein the variant definitions are all different from each other.

16. The computer program product of claim 9, wherein the method further comprises:
encrypting content such that an authorized device key in combination with the media key block is sufficient to decrypt the content.

17. A method comprising:
receiving a descriptor selected from a plurality of descriptors, the descriptor comprising: (i) a plurality of row and column definitions and (ii) a plurality of pointers, wherein each pair of row and column definitions comprises data sufficient to define a sequence key block, and wherein each of the plurality of pointers identifies a location in a predetermined table,
the predetermined table being shared among the plurality of descriptors,
wherein a total size of the plurality of descriptors is reduced by substituting the plurality of pointers for variant data in the descriptors;
from each of the plurality of pointers, resolving a data segment in the predetermine table;
assembling the resolved data segments into a plurality of variant definitions;
generating a sequence key block from the plurality of row and column definitions and the plurality of variant definitions.

18. The method of claim 17, wherein said resolving the data segment comprises:
looking up the data segment within a data source.

19. The method of claim 18, wherein the data source's contents are pseudorandom.

20. The method of claim 17, wherein the variant definitions are all different from each other.

* * * * *